(12) United States Patent
Hakala et al.

(10) Patent No.: US 6,234,275 B1
(45) Date of Patent: May 22, 2001

(54) ELEVATOR DRIVE MACHINE HAVING ROTATING TRACTION SHEAVE BETWEEN ROTORS OF MULTIPLE MOTORS ALONG THE AXIS OF ROTATION

(75) Inventors: Harri Hakala, Hyvinkää; Esko Aulanko, Kerava; Jorma Mustalahti, Hyvinkää; Tauno Pajala, Espoo, all of (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 09/359,311

(22) Filed: Jul. 23, 1999

Related U.S. Application Data

(63) Continuation of application No. PCT/FI98/00056, filed on Jan. 22, 1998.

(30) Foreign Application Priority Data

Jan. 23, 1997 (FI) .......................................... 970283

(51) Int. Cl.$^7$ ........................................... B66B 1/00

(52) U.S. Cl. ........................................... 187/277; 187/258

(58) Field of Search .................................. 187/256, 258, 187/250; 310/114, 118; 318/48

(56) References Cited

U.S. PATENT DOCUMENTS

| | | | | |
|---|---|---|---|---|
| 1,237,321 | * | 8/1917 | Fraser ..................................... | 187/256 |
| 1,750,237 | * | 3/1930 | Mayer ..................................... | 187/258 |
| 3,713,015 | * | 1/1973 | Frister .................................... | 310/114 |
| 4,375,047 | * | 2/1983 | Nelson et al. ......................... | 318/48 |
| 4,755,700 | * | 7/1988 | Yonging ................................ | 310/114 |
| 4,879,484 | * | 11/1989 | Huss ...................................... | 310/114 |
| 4,959,578 | * | 9/1990 | Varga .................................... | 310/268 |
| 5,300,848 | * | 4/1994 | Huss et al. ............................. | 310/83 |

FOREIGN PATENT DOCUMENTS

| | | |
|---|---|---|
| 2115490 | 10/1972 | (DE) . |
| 2116512 | 9/1983 | (DE) . |
| 20631969 | 1/1995 | (EP) . |
| 20631970 | 1/1995 | (EP) . |
| 30631969 | 1/1995 | (EP) . |
| 30631970 | 1/1995 | (EP) . |
| 20688735 | 12/1995 | (EP) . |
| 30688735 | 12/1995 | (EP) . |
| 1017245 | 1/1998 | (JP) . |

* cited by examiner

*Primary Examiner*—Jonathan Salata

(57) ABSTRACT

An elevator drive machine includes multiple electric motors and a traction sheave. The traction sheave is placed between the motors. With this arrangement, a higher torque is generated by the drive machine as compared to conventional solutions. Furthermore, an elevator arrangement in which such a drive is utilized exhibits efficient space utilization.

19 Claims, 7 Drawing Sheets

ELEVATOR DRIVE MACHINE HAVING ROTATING TRACTION SHEAVE BETWEEN ROTORS OF MULTIPLE MOTORS ALONG THE AXIS OF ROTATION

This application is a Continuation of PCT International Application No. PCT/FI98/00056 filed on Jan. 22, 1998, which designated the United States and on which priority is claimed under 35 U.S.C. § 120, the entire contents of which are hereby incorporated by reference.

BACKGROUND OF THE INVENTION

1. Field of the Invention

The present invention relates to elevator drive machines and more specifically to an elevator drive machine having a rotating traction sheave between rotors of multiple motors along the axis of rotation.

2. Description of the Background Art

The drive machine of a traction sheave elevator has a traction sheave with grooves for the hoisting ropes of the elevator and an electric motor driving the traction sheave either directly or via a transmission. Traditionally the electric motor used to drive an elevator has been a d.c. motor, but increasingly a.c. motors, such as squirrel-cage motors with electronic control are being used. One of the problems encountered in gearless elevator machines of conventional construction has been their large size and weight. Such motors take up considerable space and are difficult to transport to the site and to install. In elevator groups consisting of large elevators, it has sometimes even been necessary to install the hoisting machines of adjacent elevators on different floors to provide enough room for them above the elevator shafts placed side by side. In large elevator machines, transmitting the torque from the drive motor to the traction sheave can be a problem. For example, large gearless elevators with a conventional drive shaft between the electric motor and the traction sheave are particularly susceptible to develop significant torsional vibrations due to torsion of the shaft.

Recently, solutions have been presented in which the elevator motor is a synchronous motor, especially a synchronous motor with permanent magnets. For example, the specification of WO 95/00432 presents a synchronous motor with permanent magnets which has an axial air gap and in which the traction sheave is directly connected to a disc forming the rotor. Such a solution is advantageous in elevator drives with a relatively low torque requirement, e.g. a hoisting load of about 1000 kg, and in which the elevator speed is of the order of 1 m/s. Such a machine provides a special advantage in applications designed to minimize the space required for the elevator drive machine, e.g. in elevator solutions with no machine room.

The specification of FI 93340 presents a solution in which the traction sheave is divided into two parts placed on opposite sides of the rotor in the direction of its axis of rotation. Placed on both sides of the rotor are also stator parts shaped in the form of a ring-like sector, separated from the rotor by air gaps.

In the machine presented in the specification of FI 95687, the rotor and the stator parts on either side of it with an air gap in between are located inside the traction sheave. In this way, the traction sheave is integrated with the rotor, which is provided with magnetizing elements corresponding to each rotor part.

The specification of DE 2115490 A presents a solution designed to drive a cable or rope drum or the like. This solution uses separate linear motor units acting on the rim of the drum flanges.

For elevators designed for loads of several thousand kg and speeds of several meters per second, none of the solutions presented in the above-mentioned specifications are capable of developing a sufficient torque and speed of rotation. Further, problems might be encountered in the control of axial forces. In motors with multiple air gaps, further difficulties result from the divergent electrical and functional properties of the air gaps.

This imposes special requirements on the electric drive of the motor to allow full-scale utilization of the motor. Special requirements generally result in a complicated system or a high price, or both.

The specification of GB 2116512 A presents a geared elevator machine which has several relatively small electric motors driving a single traction sheave. In this way a machine is achieved that needs only a relatively small floor area. The machine presented in GB 2116512 A can be accommodated in a machine room space not larger than the cross-sectional area of the elevator shaft below it. Such an advantageous machine room solution has not been usable in the case of large gearless elevators because these typically have a machine with one large motor that extends a long way sideways from the traction sheave. The specification of EP 565 893 A2 presents a gearless elevator machine comprising more than one modular motor unit, which are connected together to drive traction sheaves also connected together. In such a solution, the length of the machine increases as its capacity is increased by adding a motor module. The problem in this case is that the length of the machine is increased on one side of the traction sheave, which is why the machine extends beyond the width of the elevator shaft below. Supporting and stiffening such a long machine so that its own weight and the rope suspension will not produce harmful deformations is likely to result in expensive and difficult solutions. For instance, the bending of a long machine requires a special and expensive bearing solution. If bending or other forms of load produce even the slightest flattening of the traction sheave to an elliptical shape, this will probably lead to vibrations that reduce the travelling comfort provided by the elevator.

SUMMARY OF THE INVENTION

It is an object of the present invention to achieve a new gearless elevator drive machine which develops a torque, power and rotational speed preferably as needed in large and fast elevators.

With the solution of the present invention, the torque is developed by means of two motors or motor blocks, the torque being thus doubled as compared with a single motor. The axial forces generated by the two motor blocks compensate each other, thus minimizing the strain on the bearings and motor shaft.

With the drive machine of the present invention, due to the good torque characteristics of the machine, a large traction sheave size in relation to the size, performance and weight of the drive machine is achieved. For instance, an axle load of 40000 kg can be handled by a machine weighing below 5000 kg, even if the elevator speed is as high as 9 m/s or considerably higher.

As the structure of the drive machine allows large rotor and stator diameters in relation to the traction sheave diameter, a sufficient torque on the traction sheave is easily generated. On the other hand, a short distance between the bearings in the direction of the axis of rotation automatically ensures small radial deflections, so that no heavy structures are needed to prevent such deflections.

Especially in the case of elevator drive machines with the highest requirements regarding load capacity, having a single traction sheave driven by at least two motors helps obviate the relatively high costs in relation to load capacity of large individual motors. By placing the traction sheave between two motors, a compact machine structure is achieved, as well as a possibility to transmit the torque, power and forces directly from the machine to the traction sheave without a separate drive shaft. By coupling the rotors of two different electric motors mechanically together with the traction sheave, these advantages are achieved to a distinct degree.

The very close integration of the rotor parts of the motor with the traction sheave results in a machine in which the rotating parts practically function as a single block, allowing improved accuracy in the control of elevator movements.

As the frame of the drive machine is used both as a shell of the motor/motors and as a carrier of the bearings of the moving parts, the total weight of and the space required by the machine are relatively low as compared with conventional hoisting machines designed for corresponding use.

In principle, bearings are only needed for each rotor, whose bearing boxes are easy to seal. Any lubricant that may pass through the sealing can easily be so guided off that it will cause no harm.

Because the traction sheave is attached substantially to the junction between the rotor blocks or because the traction sheave joins the rotor blocks together along a circle of a fairly large radius, the torque developed by the motor is transmitted directly from the rotor to the traction sheave.

In the drive machine of the invention, the air gaps can be adjusted in pairs so that they will be of equal size, and the mutual air gap sizes of the two motors/motor blocks can even be adjusted so that the motors/motor blocks will look the same to the electric drive. In this way it is possible to have two motors/motor blocks driven by a single electric drive without incurring differences in the behavior of the motors/motor blocks due to the drive machine being driven by a single electric drive.

Due to its small size and light weight with regard to its load capacity, the machine is easy to implement in terms of both machine room lay-out and installation. Elevator machines with a high load capacity are often used in elevator groups comprising several elevators. As the hoisting machine can be accommodated in a machine room floor area the size of the cross-section of the elevator shaft below it, this provides a great advantage in respect of utilization of building space.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the following, the invention will be described by the aid of an example, which in itself does not constitute a limitation of the range of application of the invention, and by referring to the attached drawings, in which.

DETAILED DESCRIPTION

Figure 1:
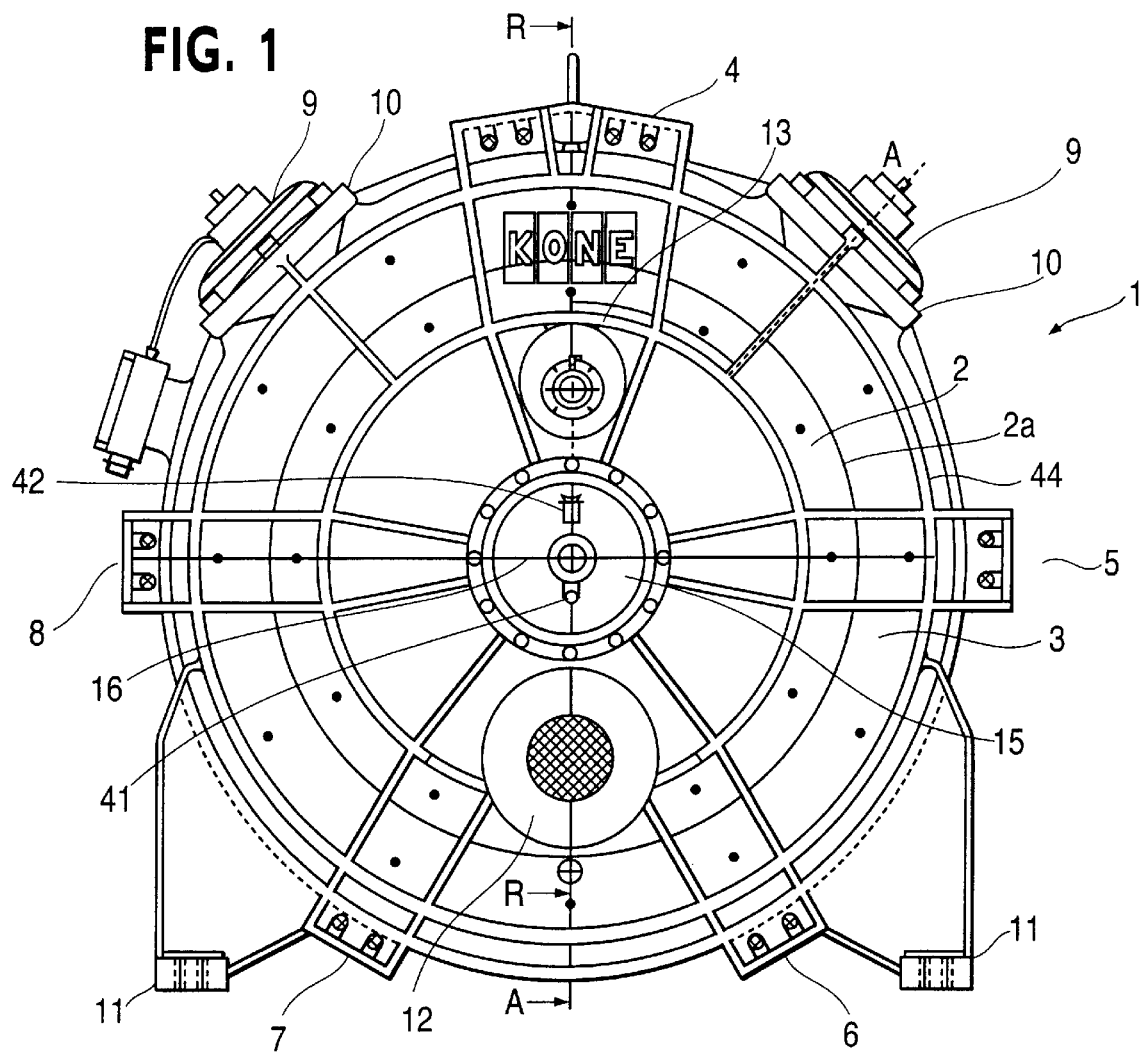
FIG. 1 presents an elevator drive machine as provided by the present invention, seen from the axial direction.

FIG. 1 shows a gearless drive machine 1 as provided by the present invention, seen from the axial direction. The figure shows the outline 2a of the traction sheave 2 of the drive machine 1 to illustrate the placement of the traction sheave in relation to the frame block 3 forming part of the frame of the machine. The frame block 3 is preferably made by casting, preferably as a cast iron block. The frame block can also be manufactured e.g. by welding from pieces of steel sheet. However, a welded frame block can probably be only used in special cases, e.g. when a very large machine is to be manufactured as an individual case. Even a frame block as high as about 2 m can be advantageously made by casting if a series of several machines is to be produced.

The frame block is stiffened by a finning 44. The finning is partly annular, including one or more rings, and partly radial. The radial parts of the finning are directed from the central part of the frame block 3 towards attachment points 4,5,6,7,8 provided along the edge of the frame block and towards the mountings 10 of the operating brakes 9 of the elevator and the legs 11 of the drive machine, by which the drive machine is fixed to its base. The legs 11 are located near the attachment points 6,7 in the lower part of the frame block. The frame block has seats for a fan 12 and a tachometer 13 with the required openings. The traction sheave bearings are behind a cover 15. The cover is provided with a duct for the adjusting screw 16 of a device for axial positioning of the traction sheave. The cover 15 is also provided with a filling hole 42 for the addition of lubricant into the bearing space and an inspection hole or window 41 for the inspection of the amount of lubricant.

Figure 2:
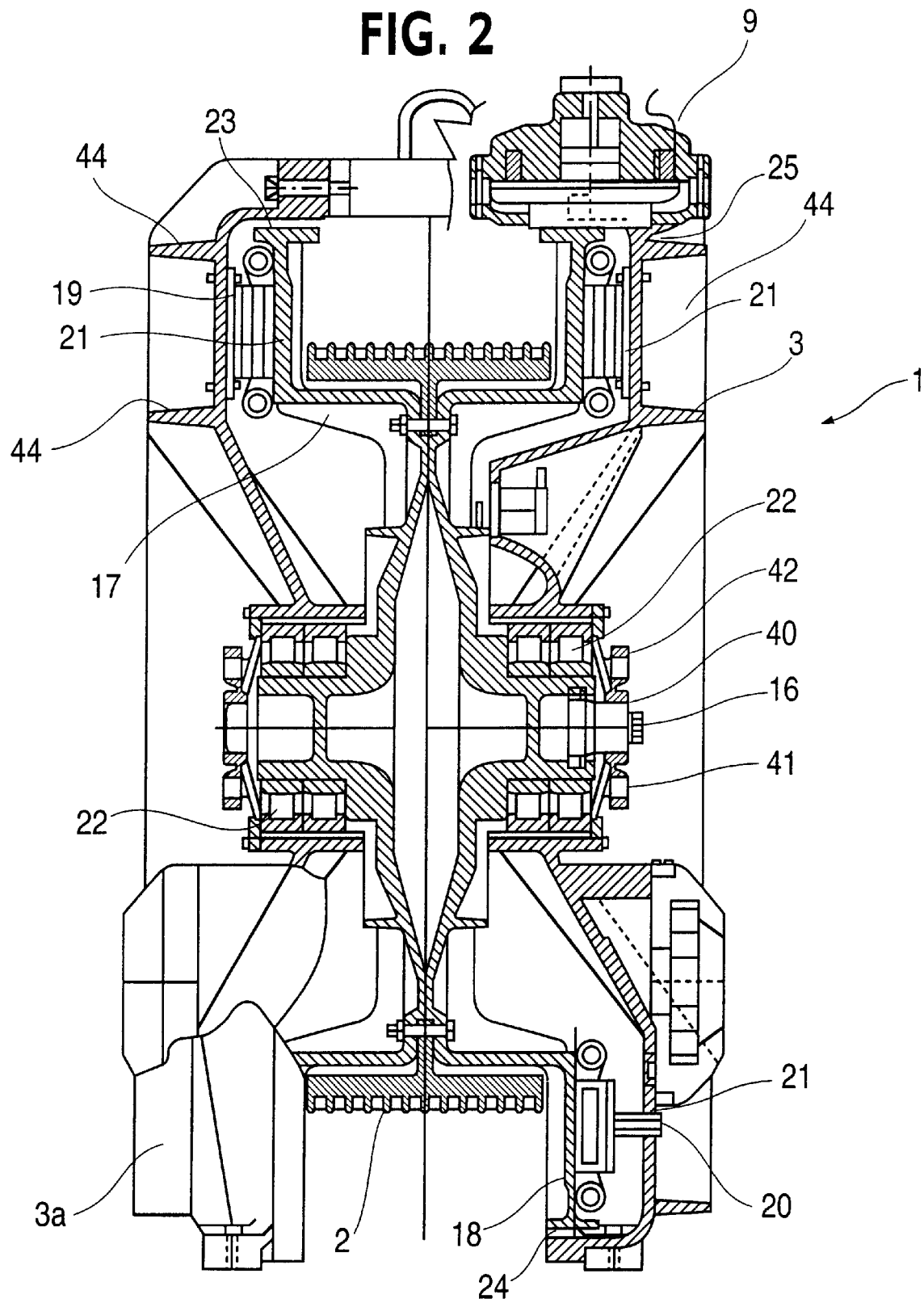
FIG. 2 presents the drive machine of FIG. 1 in side view and partially sectioned.
Figure 3:
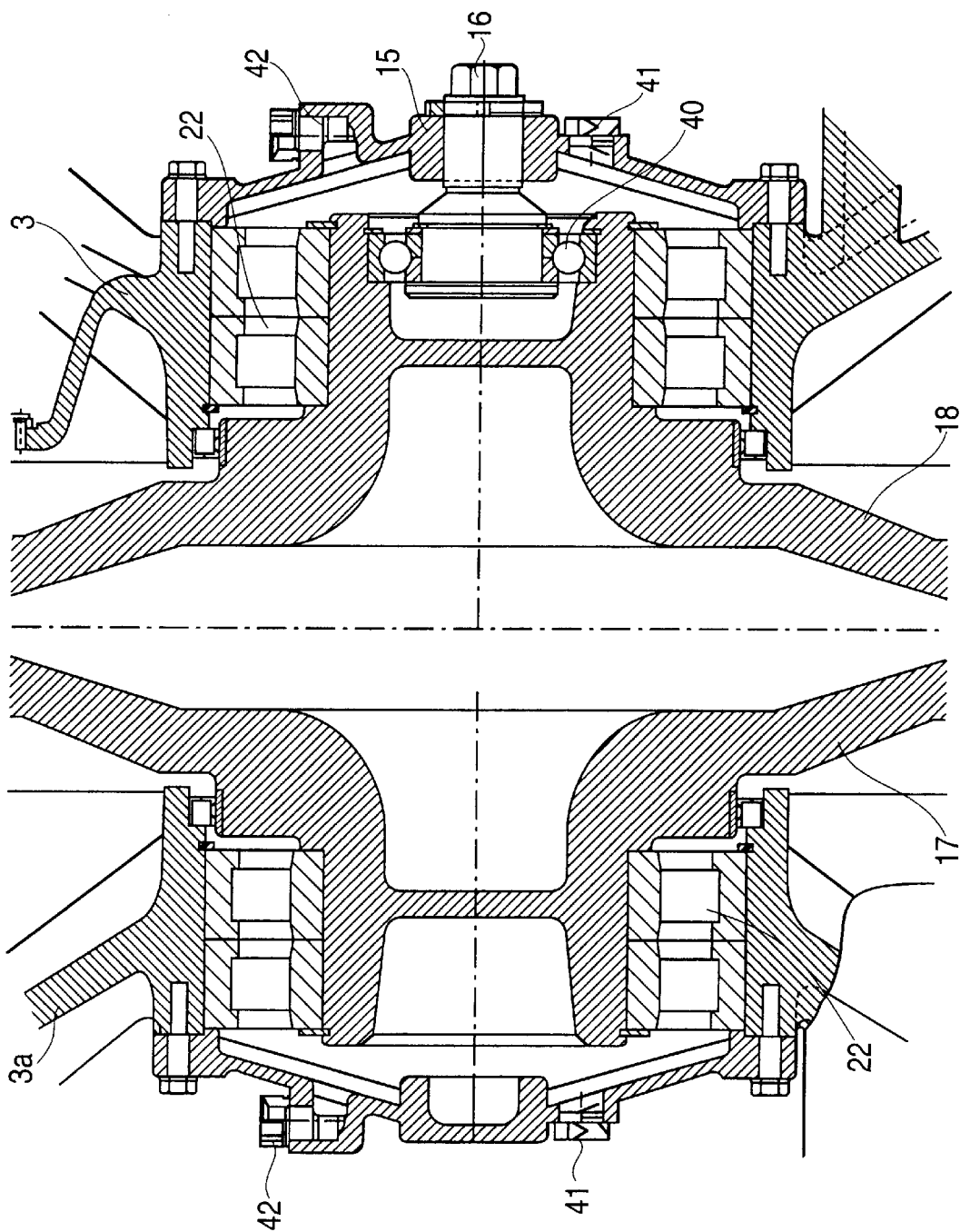
FIG. 3 presents a more detailed view of the drive machine shown in FIG. 2.

FIG. 2 presents the drive machine 1 in a partially sectioned side view. FIG. 3 presents details of the drive machine shown in FIG. 2, showing the bearing arrangement more clearly. In these figures, the part to the right of the center line of the machine shows section A—A of FIG. 1, while the part to the left shows section R—R of FIG. 1. It is largely a question of definition whether the figure represents a drive machine in which the traction sheave is placed in a motor which has a rotor and stator divided into blocks, between the two rotor blocks 17,18 of the motor and attached to these, or whether the figure represents two motors between which the traction sheave 2 is attached to the rotors 17,18 of the motors. The stators/stator blocks 19,20 are fixed to the frame blocks 3,3a. Air gaps are provided between the stators and rotors. The air gaps in the motors shown in the figures are so-called axial air gaps, in which the flux direction is substantially parallel to the motor axis. The stator winding is preferably a so-called slot winding. The rotor magnets 21 are preferably permanent magnets and attached to the rotors 17,18 by a suitable method. The magnetic flux of the rotor passes through the rotor disc 17,18. Thus, the part of the rotor disc that lies under the permanent magnets acts both as a part of the magnetic circuit and as a structural member of the rotor. The permanent magnets may be of different shapes and may be divided into component magnets placed side by side or one after the other. The rotor disc is preferably manufactured by casting from cast iron. Both the rotor disc and the frame blocks are preferably shaped so that they fit together with another identical body, so that it will not be necessary to produce a part and a counterpart separately. The rotor 17,18 is provided with roller bearings 22 supporting it on the corresponding frame block 3a,3. The roller bearings 22 support the radial forces. In very large elevators, the bearings have to carry a weight of tens of tons, because in many cases almost all of the weight of both the elevator car and the counterweight is applied via the elevator ropes to the traction sheave. The elevator ropes and compensation ropes or chains also significantly increase the weight. Axial net forces are received by an auxiliary bearing 40. Using an axial adjustment associated with the auxiliary bearing 40, the rotors 17,18 are centered so that each stator-rotor pair will have an equal air gap.

The traction sheave and the rotor blocks are attached to each other to form the rotating part of the machine, supported by bearings on the frame blocks. The auxiliary bearing 40, attached by its cage to the rotor, and the screw 16, which engages the bearing boss and is supported by the cover 15, act as an adjusting device in the bearing housing, designed to move the motor blocks in the axial direction. When the screw 16 is turned, it pushes or pulls the whole rotating part, depending on the turning direction. Since the rotor magnets in each rotor block tend to pull the rotating part towards the stator corresponding to the rotor in question and since the stators and rotors, respectively, are identical, the center-position can be found by turning the adjusting screw until the pushing and pulling force of the screw is practically nil. A more accurate method of finding the center position is by turning the rotating part and measuring the electromotive force obtained from the stators. When, as the rotating part is revolved, the electromotive force measured from the first stator block and that measured from the second stator block are the same, the rotating part has been successfully centered. Centered in this way, both stator-rotor pairs have very consistent drive characteristics and they can be driven by a single electric drive without one of the stator-rotor pairs being subjected to a higher load than the other.

The stator 19,20 together with its winding is attached by means of fixing elements to the frame block 3a,3, which, on the one hand, acts as a mounting that holds the stator in position and, on the other hand, as the shell structure of the motor and the drive machine as a whole. The fixing elements are preferably screws. Attached to the rotor 17,18 are rotor excitation devices placed opposite to the stators. The excitation devices are formed by fixing a number of permanent magnets 21 in succession to the rotor so that they form a ring.

The stator 19,20 together with the stator windings is attached with fixing elements to the frame block 3a,3, which acts both as a base for holding the stator in place and as a shell structure for the entire drive machine. The fixing elements are preferably screws. The rotor 17,18 is provided with rotor excitation devices mounted opposite to the stators. The excitation devices have been formed by attaching to the rotor a series of permanent magnets 21 in succession so that they form a circular ring.

Between the permanent magnets and the stator there is an air gap which is substantially perpendicular to the axis of rotation of the motor. The air gap may also be somewhat conical in shape, in which case the center line of the cone coincides with the axis of rotation. As seen in the direction of the axis of rotation, the traction sheave 2 and the stator 19,20 are placed on opposite sides of the rotor 17,18.

Between the frame blocks 3a,3 and the rotors 17,18 there are ring-like cavities in which the stator and the magnets are placed.

The outer edges of the rotors 17,18 are provided with braking surfaces 23,24, which are engaged by the brake shoes 25 of the brakes 9.

The rotor blocks are provided with aligning elements by means of which the permanent magnets of the first and second rotors can be positioned. The permanent magnets are mounted in an arrow pattern. The magnets can be aligned either directly opposite to each other or with a slight offset. As the rotors are of identical design, placing them in pairs opposite to each other means that while the first one is rotating forward, the second one is, as it were, rotating backward if the slot windings in the opposite stators are mounted in a mirror image arrangement. This eliminates any possible structural dependence of the operating characteristics of the motor on the direction of rotation. The rotor magnets can also be implemented with the arrow figures pointing to the same direction of rotation. The aligning elements are bolts, the number of which is preferably divisible by the number of poles and whose pitch corresponds to the pole pitch or its multiple.

Figure 4:
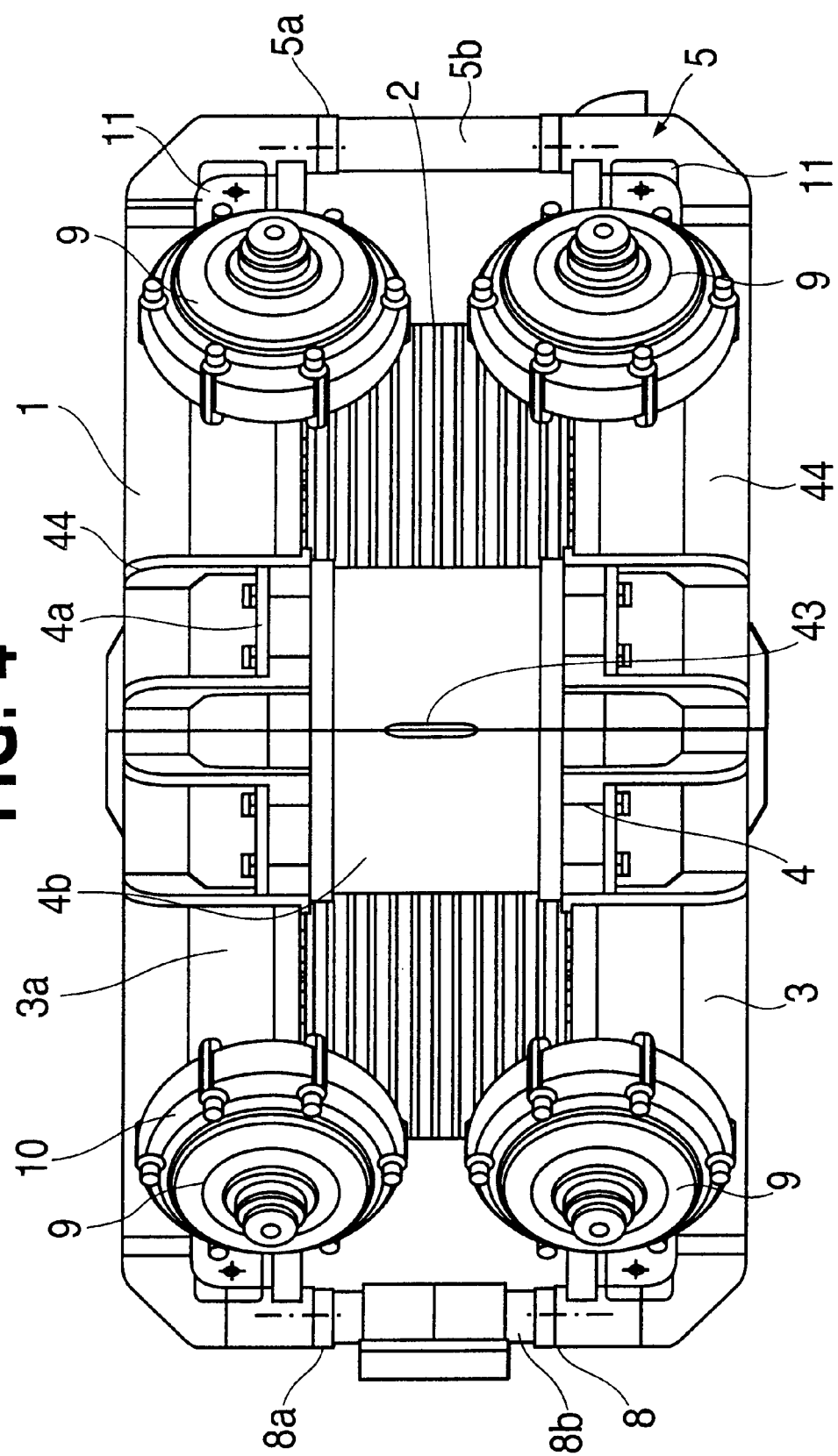
FIG. 4 presents the drive machine of FIG. 1 in top view.
Figure 5:
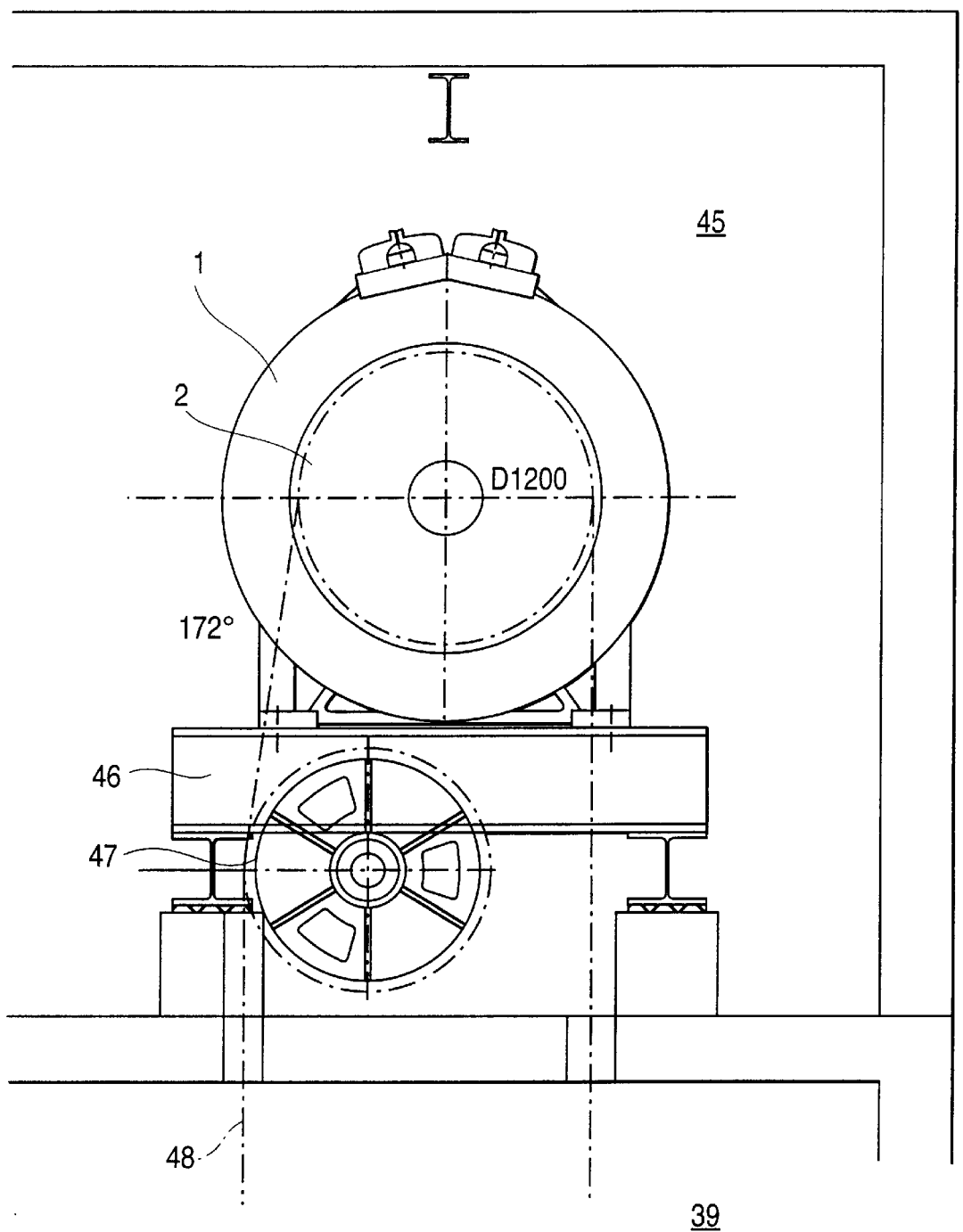
FIG. 5 illustrates the placement of the drive machine of the present invention.

FIG. 4 shows the drive machine 1 in top view. The connecting pieces 5b,8b on the sides of the drive machine which connect the attachment points 5,5a,8,8a of opposite frame blocks are clearly visible, and so is the connecting piece 4b on the top side of the drive machine which connects the attachment points 4,4a provided in the top parts of the frame blocks. The top connecting piece 4b is of a stronger construction than the other connecting pieces. This top connecting piece 4b is provided with a loop 43 by which the drive machine can be hoisted. In FIG. 5, the outline of the wall of the elevator shaft 39 below the drive machine is depicted with a broken line. The drive machine is clearly inside this outline. This means a space saving in the building. As the machine is completely contained in the space directly above the elevator shaft, the machine room arrangements above an elevator bank will be simple. Even when the cross-section of the machine room is the same size and shape as the cross-section of the elevator shaft, there will be enough space left over in the machine room around the drive machine to allow all normal service and maintenance operations to be carried out.

By placing the legs 11 near the lower edges of the machine, a maximum stability of the machine when mounted and fixed to its support is achieved. The legs are preferably located substantially outside the planes defined by the stator and rotor blocks.

FIG. 5 illustrates the way in which the drive machine 1 is placed in the machine room 45. The drive machine is mounted on a support 46 constructed of steel beams. Using a diverting pulley 47, the distance between the hoisting rope 48 portions going to the elevator car and to the counterweight has been somewhat increased from the width corresponding to the diameter of the traction sheave 2.

Figure 6:
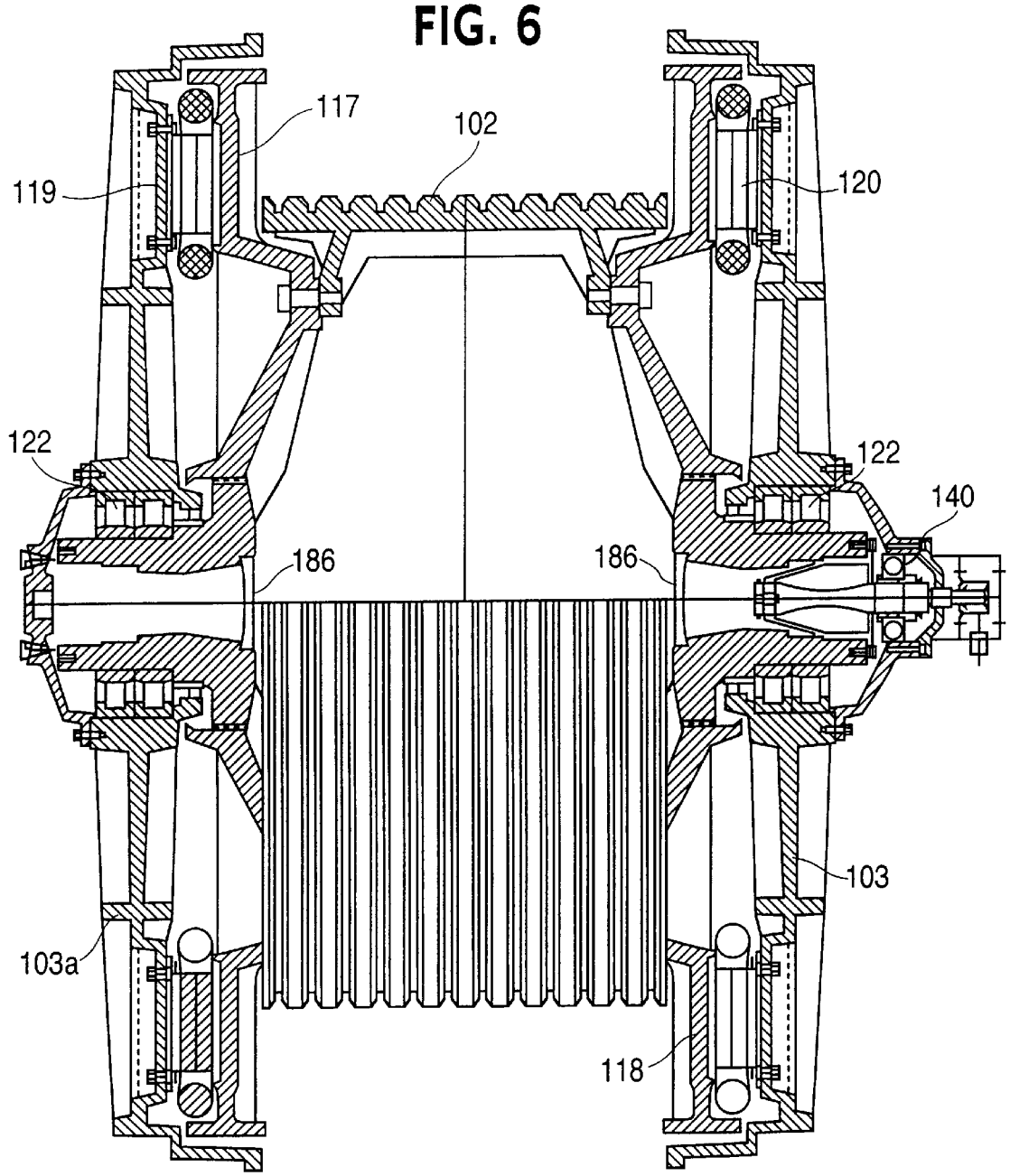
FIG. 6 presents a cross-section of another drive machine according to the present invention.
Figure 7:
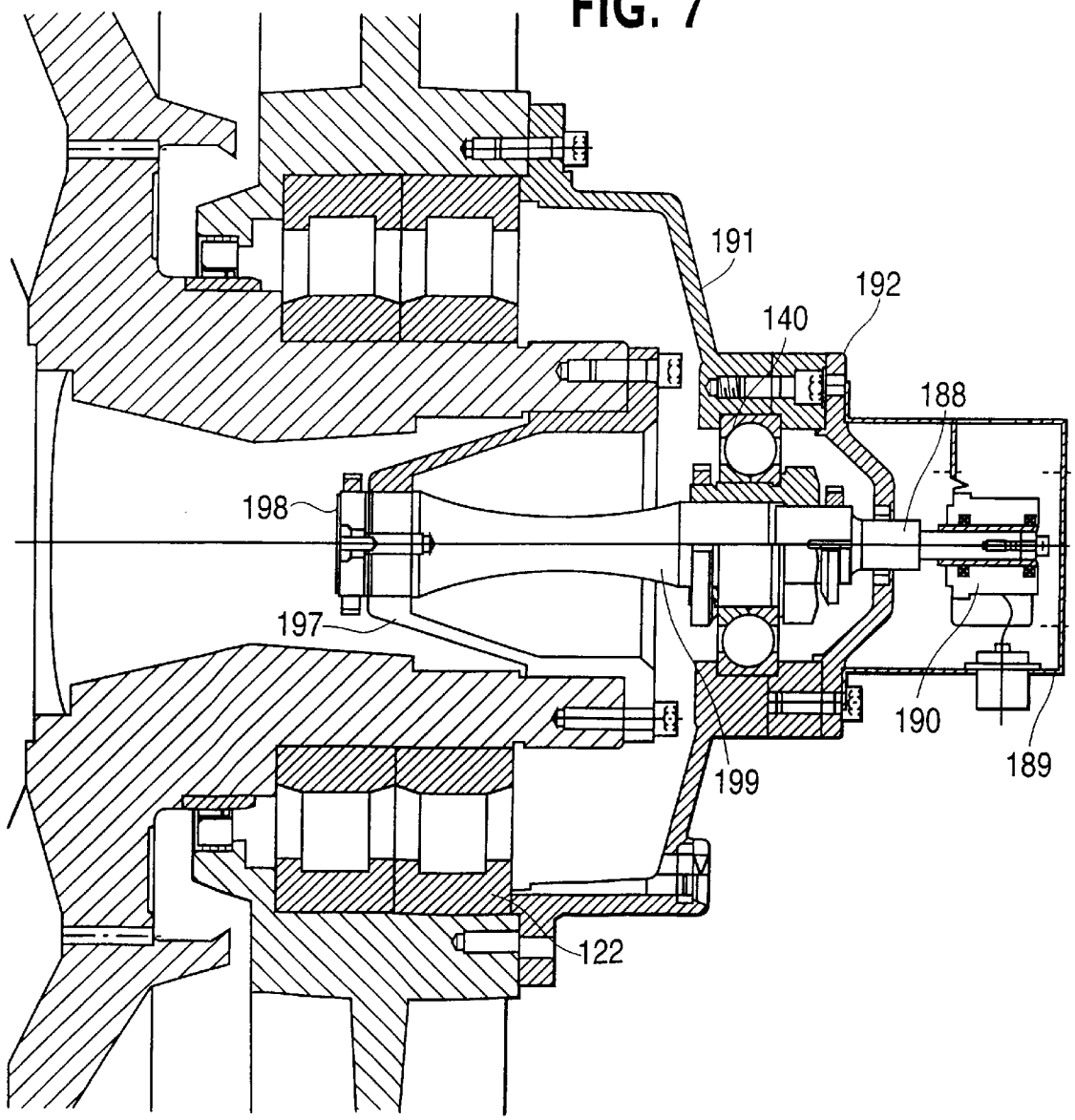
FIG. 7 presents a more detailed view of the drive machine as shown in FIG. 6.

The machine in FIG. 6 is very much like the one illustrated by FIGS. 1–4. For a practical elevator, the most important differences lie in the manner of mounting the traction sheave and in the consequent possibility of using traction sheaves of different widths (lengths) in the machine more freely depending on the need defined by each elevator to be installed, and in the manner of implementing the bearings and the outer end of the rotating shaft. FIG. 7 shows a clear illustration of the bearings and the output end of the rotating shaft.

In the drive machine in FIG. 6, each end of the traction sheave 102 is attached to a rotor 117,118. Thus, the traction sheave is placed between two rotors. In the case of an axial motor as in the present example, the most essential part of the traction sheave, i.e. the cylinder provided with rope grooves together with the rotor magnet ring attached to the traction sheave, remains entirely between two planes defined by the two air gaps perpendicular to the axis of rotation. Even if the internal structure of the motor should differ from the axial motor of the present example, it will be advantageous to place the traction sheave between the torque generating parts. The rotors 117,118 are rotatably mounted with bearings on the frame blocks 103,103a, in which the stators 119,120 are fixed in place, one in each frame block. The permanent magnets of the rotors are fixed to the rotors 117,118 by a suitable method. The magnetic flux of the rotor passes via the rotor disc. Thus, the part of the rotor disc that lies under the permanent magnets acts both as a part of the magnetic circuit and as a structural member of the rotor. The rotor is supported on the frame blocks by relatively large bearing elements 122. The large bearing size means that the bearing elements 122 can well sustain radial forces. The bearing elements, e.g. roller bearings, are of a design that allows axial motion of the machine. Such bearings are generally cheaper than bearings that prevent axial motion, and they also permit equalization of the air gaps in the stator-rotor pairs on either side of the traction sheave. The equalization adjustment is performed using a separate, relatively small auxiliary bearing 140 mounted on one of the frame blocks. The auxiliary bearing 140 also receives the axial forces between the traction sheave and the machine frame. The other frame block need not be provided with an auxiliary bearing. The auxiliary bearing 140 is fixed to a cover 191 attached to the frame block and covering the bearing space. Mounted on the cover 191 is a resolver 190 or other device for the measurement of angle and/or speed, supported by a supporter 189. The end 188 of the rotating shaft 199 transmitting the traction sheave motion projects through the central part 192 of the cover 191, and the resolver axle is attached to this shaft end. At the other end of the shaft of the machine, usually no output from the rotating shaft is needed, so a simpler cover 187 closing the bearing space is sufficient at that end. On the side facing the traction sheave, the bearing spaces are closed with covers 186.

The traction sheave and the rotor parts are attached to each other to form the rotating part of the machine, supported by bearings on the frame blocks. As the traction sheave is connected to the rotor parts 117,118 by its rim or at least by a fixing circle of a large diameter, the rotating part can be regarded as forming the drive shaft of the machine in itself. As for practical design, the deflection of such a shaft is almost nil, so the design of the bearings of the drive shaft and its suspension on the frame blocks is a fairly simple task. The auxiliary bearing 140 and the larger bearing 122 supporting the radial forces are placed one after the other in the axial direction, which is a different solution as compared with the relative positions of the auxiliary bearing 40 and the larger bearing 22 in the machine illustrated by FIGS. 1–4, in which the auxiliary bearing 40 is located inside the larger bearing 22. The successive placement of the bearings 122 and 140 allows a larger radial clearance in the bearing 122 supporting the radial load than the radial clearance of the auxiliary bearing 140, because a sufficient radial flexibility can easily be achieved in the coupling between the bearings 122 and 140. The flexibility can be increased by extending the auxiliary shaft 199 connecting the auxiliary bearing 140 to the rotor part 118 by using a mounting collar 197 to move the supporting point 198 of the auxiliary shaft inwards in the machine. Additional flexibility is achieved by providing the auxiliary shaft 199 with a waist to allow easier bending of the shaft. In this way, the smaller play of the smaller auxiliary bearing 140 can be fully utilised. Thus, the auxiliary bearing makes it possible to achieve an accurate axial position adjustment. Because of the small radial clearance, the shaft is accurately centered, which has a favorable effect on the accuracy of the resolver signal.

The auxiliary bearing 140 is connected by its cage to the frame of the machine and by its center via the auxiliary shaft 199 to the rotating part formed by the traction sheave and the rotors. By adjusting the mutual positions of the auxiliary shaft and the auxiliary bearing in the axial direction of the machine, it is possible to adjust the positions of the rotors relative to the frame. The axial adjustment may be implemented e.g. by providing the auxiliary bearing and auxiliary shaft with screw threads engaging each other.

It will be advantageous to adjust the air gaps between the rotors and stators of the drive machine to the same size. On the other hand, the air gaps can be adjusted until both motors/motor blocks look the same to the electric drive. In this way, the two motors/motor blocks can be driven by a single electric drive without incurring differences in the behavior of the motors/motor blocks due to the drive machine being driven by a single electric drive. The symmetrization of the motors/motor blocks across different air gaps can also be influenced by the mutual positions of the stators and rotors, especially by the angles of rotation between the stators and rotors.

Several alternative methods can be used to match the motors of the double-motor drive machine. When matching the motors for operation in the drive machine, the optimization can be effected by one of the following methods:

i) With the motors idling, the source voltages are measured and adjusted to the same value by adjusting the air gaps and possibly also the stator angles. There are different levels in this: adjusting the amplitude of the fundamental wave, its amplitude and phase, additionally harmonics, and combinations of these.

ii) With no load connected to the motors, the motors are coupled together and the air gap and possibly also the angle of the stator packets is adjusted so as to minimize the polyphase current. Here, too, it is possible to consider the fundamental wave and the harmonic wave separately.

iii) With a load connected to the motors, the motors are measured and the air gaps and possibly also the stator angles are adjusted until the currents in the two motors are equal. This is an advantageous alternative because any differences between the longitudinal impedances can also be taken into account.

iv) The load is increased to the maximum and the motor currents are then equalized by adjusting the air gaps and possibly also the stator angles. Both motors will now deliver a maximum torque and the load capacity of the combination is at a maximum.

In methods i) and ii), the measurements are carried out with the motor idling, thus also minimizing the energy consumption and temperature rise.

Items i)–iv) can be suitably combined, e.g. by developing a cost function using suitable weighting coefficients for the compensation of maximum load capacity, energy consumption and harmonics.

It is obvious to a person skilled in the art that the embodiments of the invention are not restricted to the example described above, but that they can be varied within the scope of the following claims.

What is claimed is:

1. An elevator drive machine, comprising:

a traction sheave; and an electric motor for driving the traction sheave, the electric motor having at least a first and a second rotor block and a first and second stator block, the rotor blocks being attached to opposite ends of the traction sheave coaxially with a center axis of revolution of the traction sheave, and a stator block being provided for each rotor block, with an air gap between each stator block and rotor block, such that substantially all the torque generated by the first rotor block and the first stator block and substantially all the torque generated by the second rotor block and the second stator block is transmitted directly to said traction sheave.

2. The drive machine as defined in claim 1, wherein the air gap between the first rotor block and the first stator block is substantially the same as the air gap between the second rotor block and the second stator block.

3. The drive machine as defined in claim 1, wherein the first and second stator blocks are fitted in frame blocks forming the end plates of the drive machine and the first and second rotor blocks are supported by bearings mounted in the frame block of the corresponding stator block, one bearing being provided for each rotor block.

4. The drive machine as defined in claim 1, further comprising rotor magnets and wherein the first and second rotor blocks are of a substantially symmetric structure and are attached to each other via junctures located inside a circle formed by the rotor magnets.

5. The drive machine as defined in claim 1, further comprising a braking surface and brake shoes, the braking surface being disposed on an outer edge of the rotor, the brake shoes being engageable with the braking surface.

6. The drive machine as defined in claim 1, further comprising bearings and an adjusting device and wherein the traction sheave and the rotor blocks are attached to each other to form a rotating part of the machine, the bearings supporting the rotating part on the stator blocks, and the adjusting device being provided in conjunction with the bearing elements to allow the air gaps of the motor blocks to be adjusted to substantially the same size.

7. The drive machine as defined in claim 1, further comprising bearings and an adjusting device and wherein the traction sheave and the rotor blocks are attached to each other to form a rotating part of the machine, the bearings supporting the rotating part on the stator blocks, and the adjusting device being provided in conjuction with the bearing elements to allow the motor blocks to be moved in the axial direction, and the rotating part being axially centered so that, when the rotating part is revolved, an electromotive force of a same magnitude is obtained from the first stator block and from the second stator block.

8. The drive machine as defined in claim 1, wherein the first and second rotors have permanent magnets and wherein the rotor blocks are provided with aligning elements by which the permanent magnets of the first and second rotors can be aligned with each other.

9. The drive machine as defined in claim 10, wherein the elevator drive machine has horizontal dimensions which are contained within vertical planes formed by an elevator shaft, the drive machine being located within an area defined by the vertical planes of the elevator shaft.

10. An elevator drive machine comprising:

a traction sheave; and an electromechanical drive apparatus including a first electromagnetic drive element and a second electromagnetic drive element, each having a rotor and a stator, for driving rotation of said traction sheave, such that substantially all the torque generated by the first electromagnetic drive element and the second electromagnetic drive element is transmitted directly to a single traction sheave, said traction sheave being positioned between the rotor of the first electromagnetic drive element and the rotor of the second electromagnetic drive element along an axis of rotation of said traction sheave, such that a first air gap is located on one side of said traction sheave between the rotor and stator of the first electromagnetic drive element and a second air gap is located on the other side of said traction sheave between the rotor and stator of the second electromagnetic drive.

11. The drive machine as defined in claim 10, wherein the first electromagnetic drive element and the second electromagnetic drive elements are each motors.

12. The drive machine as defined in claim 10, wherein the rotors of the first and second electromagnetic drive elements are mechanically coupled together by the traction sheave.

13. The drive machine as defined in claim 10, wherein the direction of the first and second air gaps is substantially axial.

14. The drive machine as defined in claim 13, wherein the directions of the first and second air gaps from stator to rotor are substantially opposite to each other.

15. The drive machine as defined in claim 11, wherein said drive machine utilizes an even number of electric motors.

16. The drive machine as defined in claim 10, wherein the drive machine is substantially shorter in a direction of the axis of rotation of the traction sheave than a diameter of the drive machine in a direction perpendicular to the axis of rotation.

17. The drive machine as defined in claim 16, wherein a length of the drive machine in the direction of the axis of rotation of the traction sheave equals about half the diameter of the drive machine.

18. The drive machine as defined in claim 16, wherein the drive machine is substantially shorter in the direction of the axis of rotation of the traction sheave than the diameter of the traction sheave.

19. The drive machine as defined in claim 10, wherein the elevator drive machine has horizontal dimensions which are contained within vertical planes formed by an elevator shaft, the drive machine being located within an area defined by the vertical planes of the elevator shaft.

* * * * *